Figure 10:
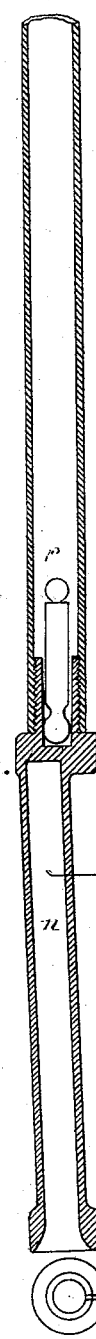
Figure 10:
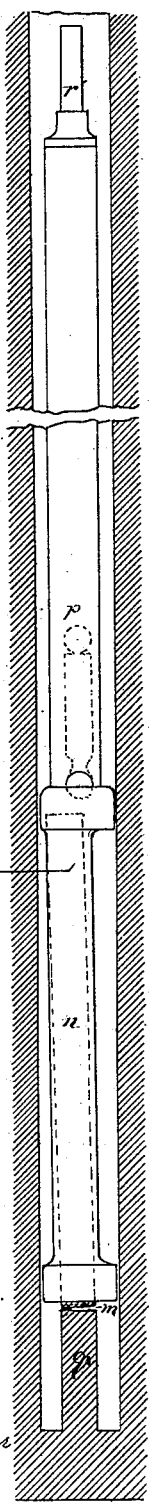

(No Model.)  3 Sheets—Sheet 1.
E. F. MACGEORGE.
CLINOMETER COMPASS AND APPARATUS FOR READING ITS INDICATIONS.
No. 281,772.  Patented July 24, 1883.
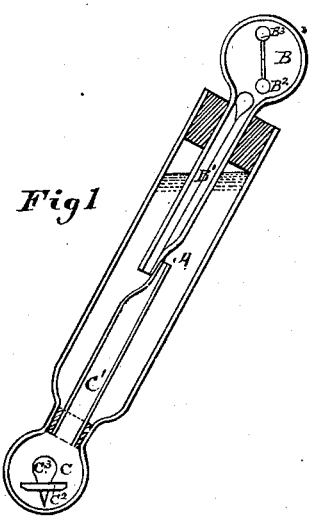
Fig 1
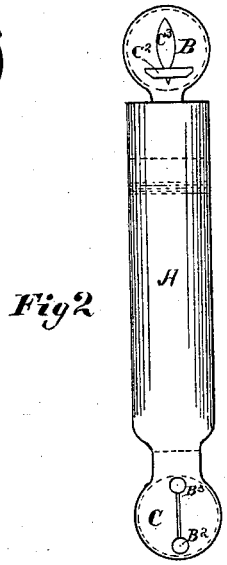
Fig 2
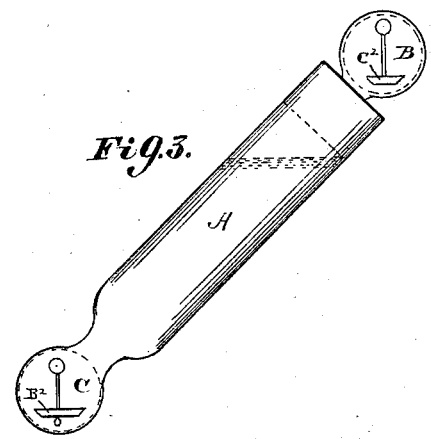
Fig 3
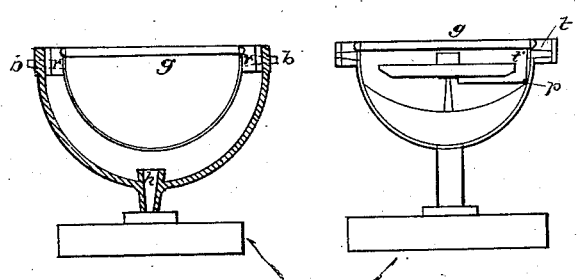
Fig. 6.
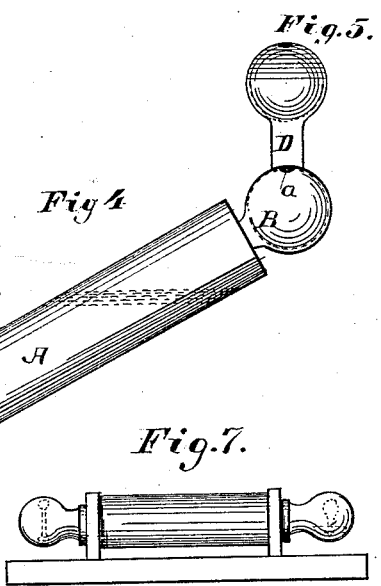
Fig. 5.
Fig 4
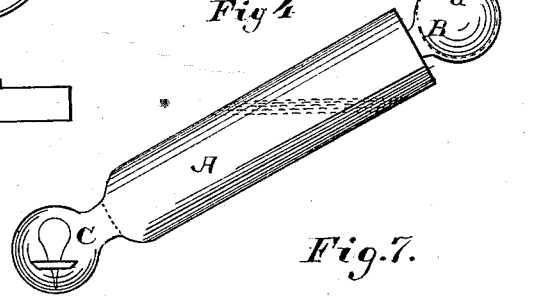
Fig. 7.
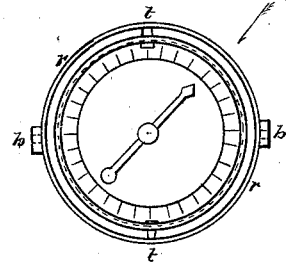
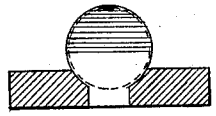
Fig. 8.
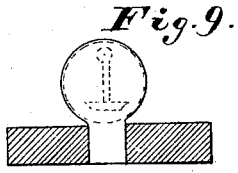
Fig. 9.
Witnesses:
Inventor:
E. F. Macgeorge
By R. D. Smith
his Attorney.

(No Model.) 3 Sheets—Sheet 2.

E. F. MACGEORGE.
CLINOMETER COMPASS AND APPARATUS FOR READING ITS INDICATIONS.

No. 281,772. Patented July 24, 1883.

Witnesses:

Inventor:
E. F. Macgeorge

Attorney.

(No Model.) 3 Sheets—Sheet 3.

E. F. MACGEORGE.
CLINOMETER COMPASS AND APPARATUS FOR READING ITS INDICATIONS.

No. 281,772. Patented July 24, 1883.

Witnesses:
J. Curtis Turner
W. E. Chaffer

Inventor:
E. F. Macgeorge
By R. D. O. Smith
his Attorney

UNITED STATES PATENT OFFICE.

EBENEZER F. MACGEORGE, OF ST. JAMES PARK, HAWTHORN, VICTORIA.

CLINOMETER-COMPASS AND APPARATUS FOR READING ITS INDICATIONS.

SPECIFICATION forming part of Letters Patent No. 281,772, dated July 24, 1883.

Application filed May 23, 1883. (No model.) Patented in Victoria August 10, 1882, No. 3,282.

*To all whom it may concern:*

Be it known that I, EBENEZER FARIE MACGEORGE, of St. James Park, Hawthorn, in the British Colony of Victoria, gentleman, have invented an Improved Clinometer-Compass and an Improved Apparatus for Reading its Indications, (for which I have obtained a patent in Victoria, No. 3,282, bearing date the 10th day of August, 1882,) of which the following is a specification.

My invention consists of an improved clinometer-compass or altazimuth-instrument and of an improved apparatus for reading its indications. When used as a self-acting clinometer-compass or automatic altazimuth-instrument, it registers within itself the degree of inclination and the magnetic bearing of that inclination at which it has been allowed for a certain time to repose. This internal registration of gradient and azimuth is such that by inspection the clinometer-compass may be replaced after removal in exactly the same position as to gradient and azimuth as that in which it previously reposed.

The first form of this clinometer-compass is as follows: A vial of glass or any non-magnetic material has at its lower end a transparent bulb or chamber containing a magnetic needle attached beneath a float of glass or other non-corrosive non-magnetic material, which needle is pivoted on a spike of light material passing downward through it and touching lightly the bottom of the hollow bulb. This bulb is filled completely with any solidifiant fluid—such as a gelatinous, crystallizing, or glutinous solution—thick enough to form a firm jelly or mass on cooling. This needle, buoyed up to the point of leaving the bottom, is free to assume the magnetic meridian while the solution is fluid, but is fixed in that position as it congeals. A contracted glass tube socketed in the neck of the bulb keeps the magnet-float from escaping, and, while allowing for expansion, keeps the bulb full of fluid, thus preventing the formation of bubbles or free surfaces in the liquid, which would impair the freedom of the needle. I make the needle deep and narrow in proportion to its length, so as to give the utmost directive and defining power within the space it occupies. At the upper end of said vial is another bulb, from which descends another contracted pipe, also socketed in the neck of such bulb and completely filled with the solidifiant fluid. In this fluid I immerse a floating plummet, either rigid or flexible, between float and weight, as shown in drawings, which is so adjusted as to remain perpendicular, and lightly touching that which is for the time being the upper part of the bulb, whatever position the vial is made to assume. The spheroidal form of both upper and lower bulbs prevents the plummet and magnet from touching the sides of their chambers, the plummet from its buoyancy and the magnet by its weight seeking always the central part of the concave it touches. The vial itself is also nearly filled with the solidifiant fluid, and thus keeps the air from entering the bulbs through the tubes, while at the same time receiving the surplus or supplying the defect of their contents. These bulb-tubes may be either separate or joined in one in the position shown, so that accidental air-bubbles will in being expelled be unable to pass out of one into the other. Except for difficulty of manufacture, I should prefer to join them in one. Figure 1 shows this form of my clinometer-compass, A being the vial, and B and C the respective bulbs. B' and C' are the contracted tubes. $B^2$ is the plummet, and $C^2$ the magnetic needle. $B^3$ and $C^3$ are the respective floats.

The second form of this instrument is as follows: The magnet-float is placed in the upper bulb and lightened, so that it touches the upper concave and pivots there, while the plummet is placed in the lower bulb, is made slightly heavier, and rests on the bottom. This form is shown in Fig. 2, where the plummet and magnetic needle, with their respective floats, are similarly marked to Fig. 1.

The third form of the instrument is as follows: The magnet-float is placed in the upper bulb, the connecting-line between float and magnet being either rigid or flexible, and the whole apparatus being delicately adjusted, so that if the upper bulb only is visible the said line will give the perpendicular and the magnet the meridian by inspection. I still continue the sunken plummet in the lower bulb, and with the addition of a magnet, as shown, the readings of which, with the perpendicular line shown, will either check the indications of the upper bulb or be available if only the lower bulb can be seen. Either of these forms may be used separately, if desirable, or both conjointly, as described. Fig. 3 illustrates this method of construction.

The fourth form of the instrument is illustrated in Fig. 4, and is as follows: The upper bulb contains only a bubble, $a$, and, on the fluid congealing, the bulb and attached vial may be replaced at any time at their original inclination by means of a spirit-level of the form shown in Fig. 5, being of glass tubing, D, with lower end fitting the bulb squarely, and applied centrally to the fixed bubble, while its upper end, terminating in a bulb, as shown, may be graduated, as shown, by "parallels of latitude" at definite intervals, by which means, if the barrel of the vial be leveled, the angle of inclination may be at once read off with the aid of a micrometer from the spirit-bubble in the bulb.

The fifth form of instrument may also be used either with or without a lower bulb containing a magnet. It is of the form shown in Fig. 5, and is graduated by the parallel circles, as shown. The solidifiant fluid, with which it is nearly filled, will on cooling leave a bubble under or near one of these parallels, which will, by the use of a micrometer, give at inspection the angle of solidification. Either of these upper bulbs may be used in conjunction with a lower bulb containing either a magnet or a magnet-plummet, as before described. The fluid used may be of the kind which consolidates within a certain time of its own accord; or it may be of such a nature that upon the admission of air or any gas, fluid or solid, by a connection under manual control, the contents of the vials will crystallize or solidify; or the same result may be brought about by a detent released by a train of clock-work set to a given time. If the apparatus is used as a hand clinometer-compass, three forms of which are represented by Figs. 7, 8, and 9, with magnet and plummet, bubble or magnet-plummet, the fluid may be of a non-solidifying nature.

The sixth form of instrument is shown in Fig. 6, and is as follows: A box-compass is so arranged and suspended in gimbal-rings, similar to a ship's compass, that it may when free hang level, and thus by its face indicate a horizontal plane, and at the same time the magnetic needle be free to indicate the meridian. But when the elastic suspending clips or clamps are allowed by an upward movement of the detent-pin $h$ to close together, they jam and clamp on the conical bearings $b\ b$, and compress the elastic gimbal-ring $r\ r$ so as to contract its diameter there and by so much expand it in the reverse direction and increase its diameter, so that the conical axes affixed to its interior at $t\ t$ are drawn partly out of their conical bearings in the compass-box, and thereby clamp and arrest its movement. Attached to one of these, as at $t'$, by a stud passing loosely through a hole in its vertical leg is a stop-lever, which is drawn out by the same movement, and, turning on its pivot $p$, presses upward by its horizontal leg the compass-needle off its pivot against the glass horizontal surface or cover $g$, thus clamping the needle. The whole apparatus, being now clamped in the position assumed while in the desired situation, may be removed for inspection, the horizontal surface giving a horizon to which the angle of its containing-vessel (of like dimensions with the vials before described) may be referred and the azimuth indicated by the needle being the direction of the inclination of the said vessel. The sixth form may be used also in a fluid for steadying purposes. The motion of the detent-pin necessary to clamp the apparatus is obtained by clockwork set to a given time, like an alarm, and contained in another part of the instrument. It may also be brought about by electric circuit, if required, or by a connecting line or tube actuated by hand at pleasure.

In all these forms the lower bulb, whether containing magnet alone or plummet alone, or magnet-plummet, may, like the upper bulb, whether containing magnet, plummet, or magnet-plummet, be used singly and separately with a fluid either of a consolidating or non-consolidating nature, according as it is used for indirect or direct observation.

Figure 11:
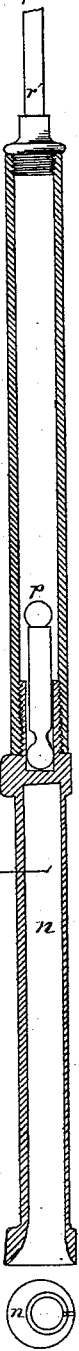

In each of this series of modifications my automatic compass-clinometer is to be included in one strong guide-tube impervious to air or water at whatever pressure, and forms one complete apparatus, which may be used for testing the deviation of bore-holes, for example; or one or more of any one of these modifications may be used for the same purpose and similarly inclosed, the object of multiplying the number of these clinometer-compasses for any one observation being to obtain a number of readings, from which a mean may be taken, and the object of varying the form of the instrument being to eliminate errors which may be peculiar to any one form by combining the indications of diverse forms in one mean reading, the principle being the same as that upon which all careful surveys are made—viz., by a mean of many readings under diverse circumstances. By a series of observations at progressive measured depths in a bore-hole (as by a "traverse" in ordinary survey) the exact path of a bore-hole, however irregular, may be defined and plotted on paper for future guidance and for the present safety of the drill, which is more frequently injured by the irregularities in the line of bore than by any other cause. At the same time, when cores are left standing at the bottom of bore-holes, they may be extracted in such a manner as to enable the operator to hold them for inspection on the surface in the exact position they occupied below, and from thence to deduce the dip and strike or the "lay" of the strata and reefs from which they are taken, so that it may be inferred to what quarter of the compass and at what "underlie" any reef pierced by the drill is tending. Fig. 10 shows the apparatus for this purpose, which is attached to the foremost end of the guide-tube. It consists of a tube whose mouth fits the bore-hole outside and the core inside. Its other end, which also fits the bore-hole, is fixed eccentrically upon the guide-tube, and the intervening tube or core-extractor, which is split and sprung from end to end, so as to compass and secure the core, is consequently set at an angle with the core. The operator, by means of connecting-rods $r'$, pushes the apparatus down straight upon the core, which enters the elastic tube, and is pressed at the same time to one side by its eccentricity. Eventually the core will snap at $m$, and the apparatus, after being allowed to rest without further disturbance for some hours to allow the contents of the vials in the guide-tube to "set," is withdrawn, bringing the core up with it. The same operation can be done by a tube of eccentric bore also slotted on thin sides. (See Fig. 11.) Upon unscrewing the core-extractor $n$, which has a tube attached to its upper end, $p$, containing a vial of the "third form," the projecting bulb of which, remaining attached to the core-extractor, will enable that and the core $q$ it contains to be set in the same position as it was taken from in the bore-hole. By making a mark upon the core itself through the slot in the tube before withdrawing the core from the core-extractor it may be readily placed bare in its true position, and by the veins and lamination of it the angle and bearing of the strata it belonged to may be inferred. The remainder of the vials in the guide-tube will give a number of readings, from which the gradient and azimuth of the bore-hole itself may be more exactly ascertained.

Figure 12:
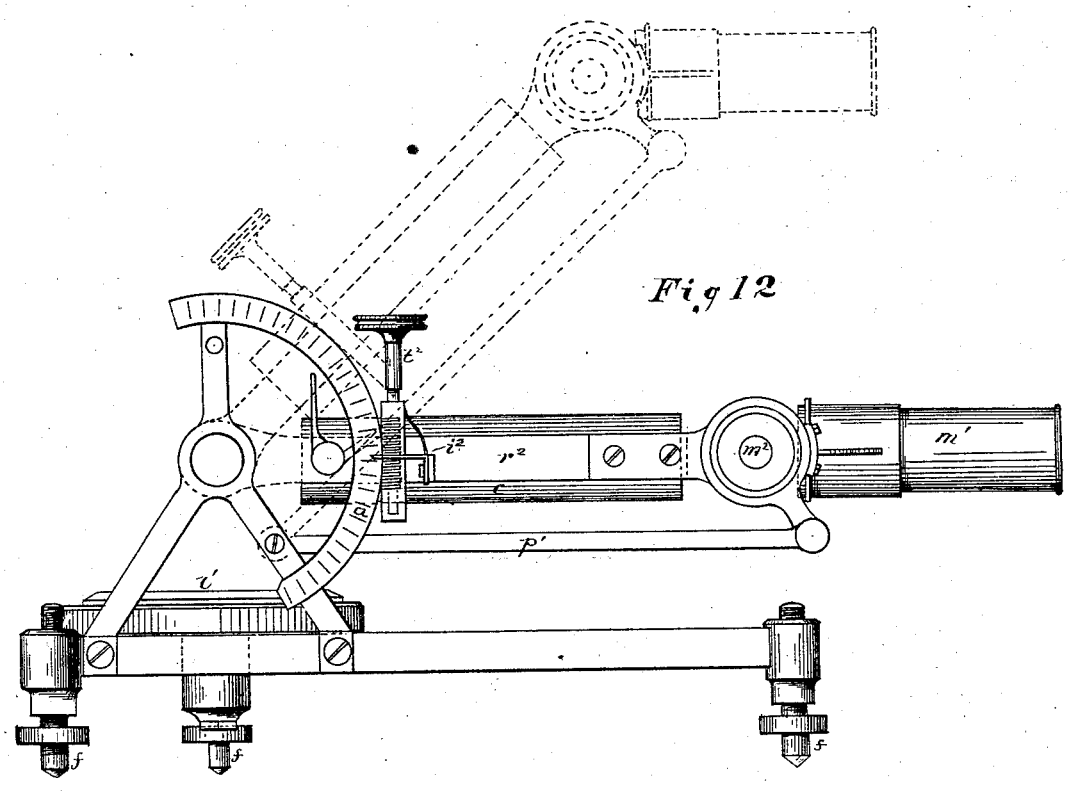
Figure 13:
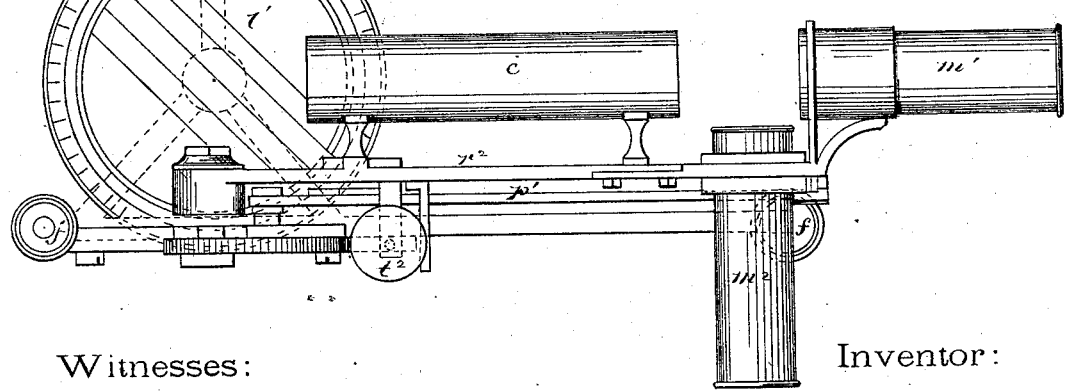

For reading off the angles of inclination to the horizon or perpendicular and of magnetic azimuth, as indicated by the consolidated contents of the vials, I employ an apparatus of which Figs. 12 and 13 represent, respectively, a side elevation and plan. A tripod-framing with leveling-screws $f\,f\,f$ supports a vertical arc, $a\,a$. Socketed in the center of this arc is an arm, $r^2$, carrying a cradle, $c$, which may be either a slotted and "spring" tube, or clips or V's, as best suits the shape and size of the compass-clinometer usually inserted in it. This arm carries an index, $i^2$, which moves with it round the graduated arc $a\,a$, and by which the angle from the vertical may be read. At the extremity of this arm is socketed one member or link of the parallel motion $p'\,p'$, as also the microscopes $m'\,m^2$, which are rigidly fixed together, and are kept with their axes at right angles and truly horizontal in all positions of the arm by the parallel motion. Stretched in the inner end of each microscope are hairs placed truly vertical for the purpose of ascertaining that the congealed plummet in the upper bulb of the vial is truly vertical—a result which is attained by revolving the vial in its cradle and by raising or lowering the arm by the tangent-screw and worm $t^2$. Revolving horizontally in an axis in the tripod-stand is a circular mirror, $l'$, in a graduated framing, touching the index $i$. Crossing the mirror at convenient distances, and consequently revolving with it, are several parallel lines. The vial having been already brought by the observation of the congealed plummet to the position in which it became embedded, the mirror is revolved beneath the magnet bulb or chamber until the reflection of the magnet is bisected longitudinally by one of the parallel lines. The azimuthal angle read at the index $i$ is the magnetic azimuth of the inclined vial.

In the case of the "fourth and fifth form" of the instrument the microscopes $m'\,m^2$ may be modified or altogether dispensed with, according as the spirit-level or the graduations are used to ascertain the inclination of the vial at the time of congelation.

In my clinometer-compass the needle may be wholly immersed, floated, or semi-floated, and touching either a bottom or top surface, for both direct observation, as in direct surveying or marine operations, (in which case the fluid may be non-congealing,) and for indirect observations, such as the survey of bore-holes, of buried mains, of the sinuosities of sounding-lines, of the gradient of the bottom on which the lead rests, &c., in which latter cases the fluid must be of a congealing or consolidating nature, so as to fix the results for after examination and record. Either clinometer or compass, or both combined, may be used in conjunction with a viscid fluid for the purpose of obtaining a mean of shifting or fluctuating azimuths or gradients, or both, during a certain period of time—as, for example, on board ship to obtain a mean course steered or a mean inclination of the ship under stress of canvas or driving-power.

I do not claim the use of glass tubes or vials containing a congealing or consolidating fluid for the purposes herein described, because that forms part of the invention for which I have already obtained Letters Patent in the United States of America, No. 270,597, and dated the 16th day of January, 1883; but What I believe to be new, and therefore claim as my present invention, is—

1. The clinometer-compass or altazimuth-instrument, in which there is a bulb at one or both ends of the vial filled with a fluid capable of solidifying, as described, and containing a floating clinometer plummet and compass adapted to assume a central position by contact with the concave surface of the bulb, substantially as described.

2. A clinometer-instrument in which there is a bulb at one or both ends of the vial, the surface of said bulb being ruled with concentric lines indicating angular distances from the vertical axis of the instrument, and the interior of said bulb containing a floating indicator in contact with the uppermost interior surface, and filled with a fluid capable of solidifying, as set forth, whereby the position as to the vertical of the contact-point of said indicator may be discovered by reading said concentric ruled lines, as set forth.

3. The vial A, having at one or both ends a bulb with a tubular extension therefrom reaching to the center of said vial, or thereabout, whereby, when said bulb has been filled with fluid and the vial has been almost filled with the same fluid, air cannot enter said bulb, whatever may be the position of the vial, and expansion of the contained fluid when solidifying cannot burst the bulb.

4. A vial, A, constructed with a bulb, C, at one end, and an inserted tubular extension, $c'$, for the same, reaching to the center of the vial, or thereabout, and a stopper at the other end of said vial, and a bulb, B, with its tubular extension B' passing through said stopper to the center of said vial, or thereabout, combined with a floating plummet and a floating compass, and a contained liquid capable of solidifying, substantially as and for the purpose set forth.

5. The clinometer-compass and altazimuth-instrument comprised in the vial A, with its bulb or bulbs, their contained plummet and compass, and the fluid contents capable of solidifying, substantially as set forth, combined with the reading-instrument, comprising the holder $c$, the microscopes $m'$ and $m^2$, having fixed relations to each other, a leveling-stand, and graduated limbs, whereby positions of the parts may be read, substantially as set forth.

6. The clinometer-compass and altazimuth-instrument composed of a vial, A, with its bulb or bulbs, the contained plummet and compass, and the fluid capable of solidifying, substantially as set forth, combined with the inclosing-tube $p$ and the core-extractor $n$, whereby the core may be brought to the surface and restored to its natural position, substantially as set forth.

E. F. MACGEORGE.

Witnesses:
EDWARD WATERS,
WALTER SMYTHE BAYSTON.